US012695246B2

(12) United States Patent
Burkett et al.

(10) Patent No.: US 12,695,246 B2
(45) Date of Patent: Jul. 28, 2026

(54) BREAK-AWAY CONNECTOR FOR DATA AND ELECTRICITY

(71) Applicant: KABA Labs, Inc., Austin, TX (US)

(72) Inventors: Karl Burkett, Austin, TX (US); Christopher Wolfe, Newmarket, NH (US); Christopher Brown, Haverhill, MA (US); Marcus Van Kommer, Madbury, NH (US)

(73) Assignee: KABA LABS INC., Austin, TX (US)

( * ) Notice: Subject to any disclaimer, the term of this patent is extended or adjusted under 35 U.S.C. 154(b) by 0 days.

(21) Appl. No.: 18/873,066

(22) PCT Filed: Sep. 19, 2024

(86) PCT No.: PCT/US2024/047374
§ 371 (c)(1),
(2) Date: Dec. 9, 2024

(87) PCT Pub. No.: WO2025/128170
PCT Pub. Date: Jun. 19, 2025

(65) Prior Publication Data

US 2026/0005473 A1 Jan. 1, 2026

Related U.S. Application Data

(60) Provisional application No. 63/610,440, filed on Dec. 15, 2023.

(51) Int. Cl.
*H01R 13/633* (2006.01)

(52) U.S. Cl.
CPC .................................. *H01R 13/633* (2013.01)

(58) Field of Classification Search
CPC .................................................... H01R 13/633
USPC .......................................................... 439/180
See application file for complete search history.

(56) References Cited

U.S. PATENT DOCUMENTS

| | | | | |
|---|---|---|---|---|
| 2,906,280 | A | 9/1959 | Mount | |
| 4,709,975 | A | 12/1987 | Williams, II | |
| 5,346,406 | A | 9/1994 | Hoffman et al. | |
| 5,365,973 | A * | 11/1994 | Fink, Jr. ............. | F16L 55/1015 137/614.04 |

(Continued)

FOREIGN PATENT DOCUMENTS

| | | |
|---|---|---|
| CA | 2509084 | 12/2006 |
| CA | 2970713 | 11/2017 |

OTHER PUBLICATIONS

WO/ISR for PCT/US24/47374, dated Nov. 20, 2024.

*Primary Examiner* — Abdullah A Riyami
*Assistant Examiner* — Thang H Nguyen
(74) *Attorney, Agent, or Firm* — FASKEN MARTINEAU DUMOULIN LLP; Kimberly A. Peaslee

(57) ABSTRACT

The system and method for a break-away connector for data and/or electricity. In some cases, the break-way connector has two halves, where one half is inserted into the second half. The half inserted into a mating half may comprise a pair of external housing O-rings. These O-rings provide a way to adjust the force required to separate the two halves. Each half has a tether anchored to a housing that receives an insert. In some cases, an insert is threadedly engaged within a respective housing. The insert may have a plurality of ribs to provide a barrier between a plurality of contacts. The insert may have a set screw style terminal.

17 Claims, 7 Drawing Sheets

(56) References Cited

U.S. PATENT DOCUMENTS

| | | | | |
|---|---|---|---|---|
| 6,146,188 | A * | 11/2000 | Snyder | H01R 13/635 439/682 |
| 6,283,781 | B1 | 9/2001 | Mori | |
| 6,648,101 | B2 | 11/2003 | Kurtgis | |
| 6,910,911 | B2 * | 6/2005 | Mellott | H01R 13/6272 439/341 |
| 7,914,308 | B2 * | 3/2011 | Boyd | H01R 24/28 439/180 |
| 8,187,014 | B2 * | 5/2012 | Laughlin | H01R 13/633 439/258 |
| 8,410,369 | B2 * | 4/2013 | Kim | H01R 13/5841 439/923 |
| 10,044,137 | B2 * | 8/2018 | Petrie | B60L 53/16 |
| 10,553,386 | B2 | 2/2020 | von zur Muehlen et al. | |
| 11,391,731 | B2 | 7/2022 | Oga | |
| 11,724,614 | B2 * | 8/2023 | Légaré | B60L 53/31 320/109 |
| 2011/0065305 | A1 | 3/2011 | Amit et al. | |
| 2012/0129369 | A1 | 5/2012 | Bogart et al. | |
| 2012/0309214 | A1 * | 12/2012 | Beluse | H01R 13/633 439/490 |
| 2013/0193923 | A1 | 8/2013 | Kimura et al. | |
| 2016/0240914 | A1 | 8/2016 | Puente Balliarda et al. | |
| 2016/0240941 | A1 * | 8/2016 | Stavrianoudakis | H01R 4/5058 |
| 2023/0115236 | A1 | 4/2023 | Thomas et al. | |
| 2023/0182659 | A1 | 6/2023 | Hitchcock et al. | |

* cited by examiner

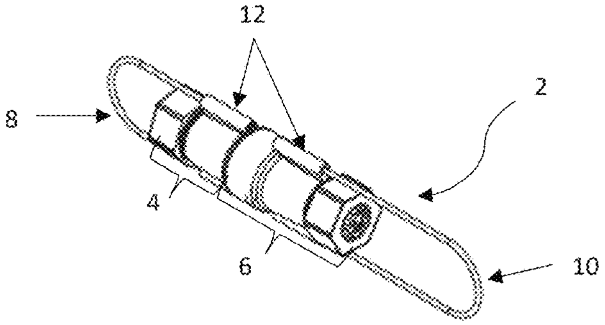
FIG. 1
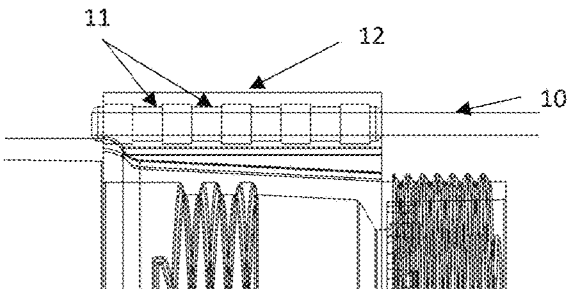
FIG. 1A
FIG. 2
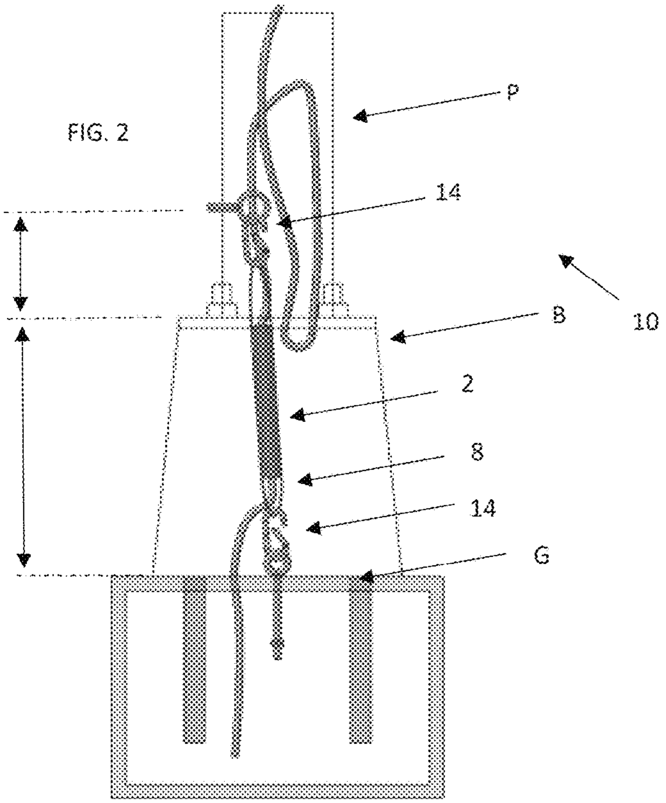

FIG. 3A
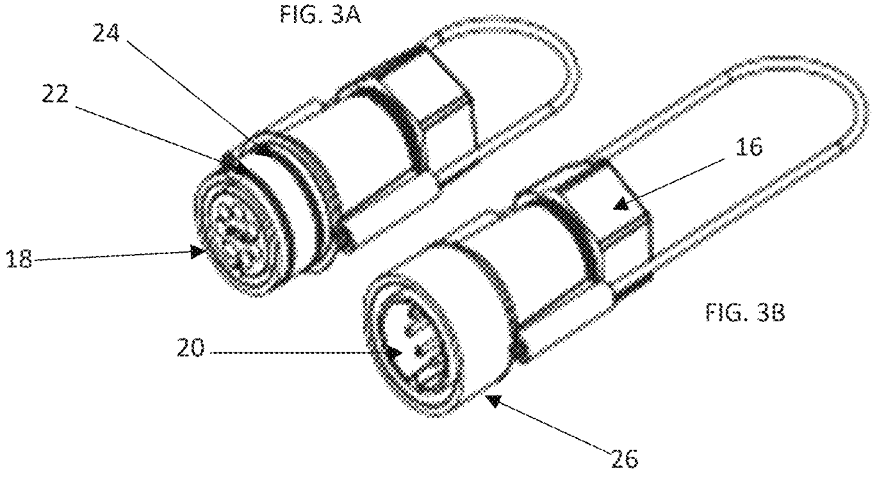
FIG. 3B
FIG. 4A
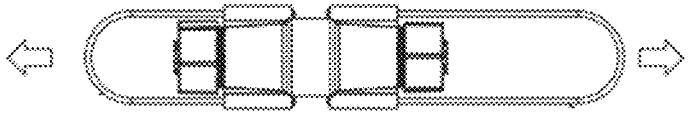
FIG. 4B
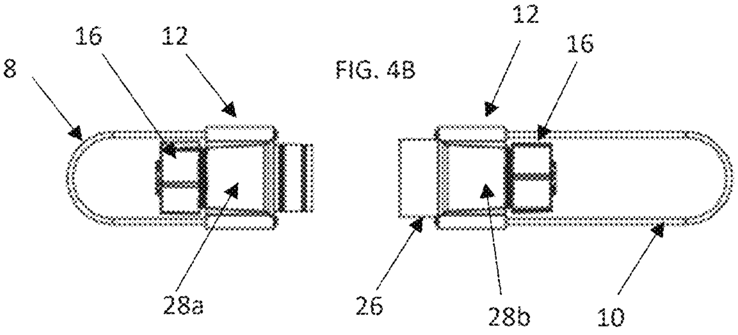

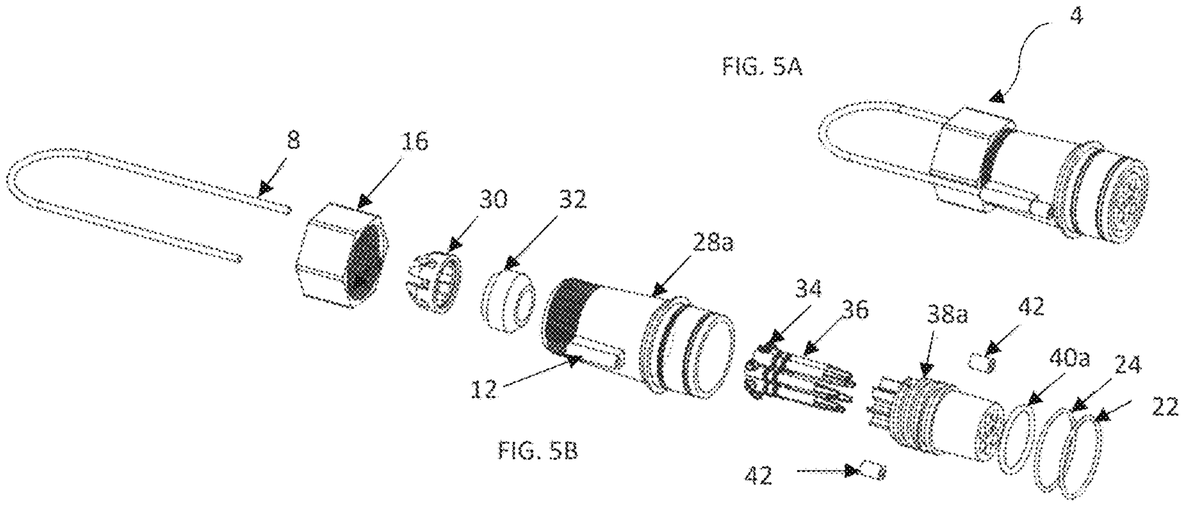
FIG. 5A
FIG. 5B
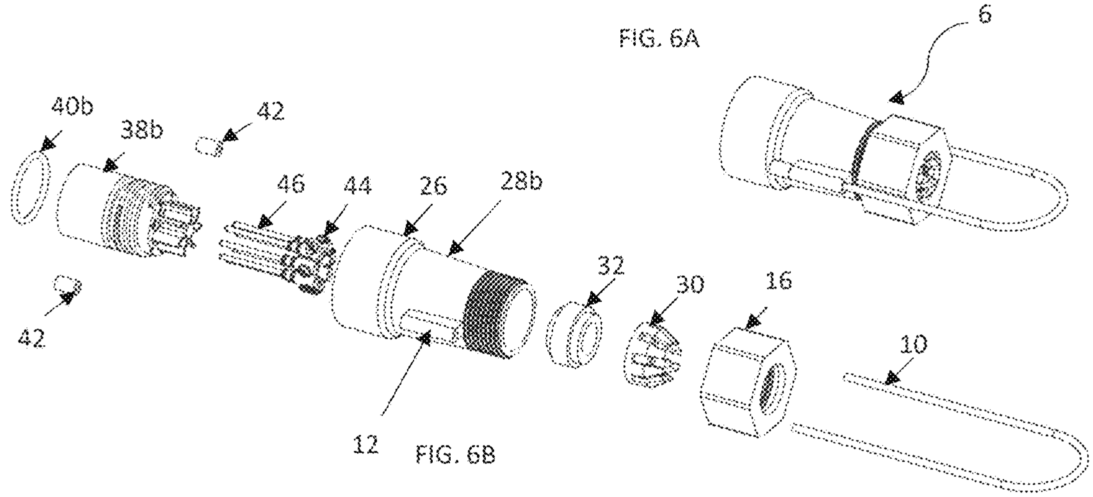
FIG. 6A
FIG. 6B

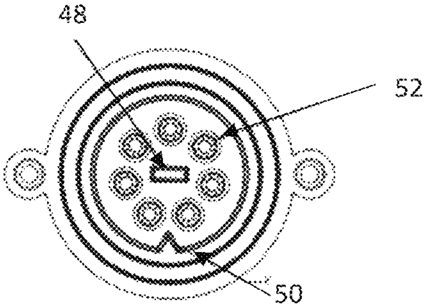
FIG. 7A
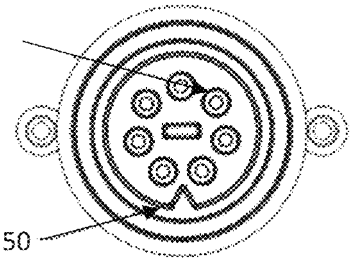
FIG. 7B
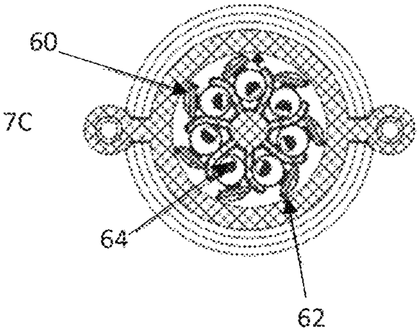
FIG. 7C
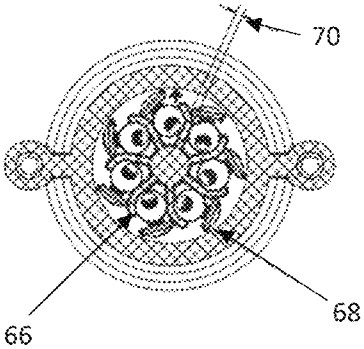
FIG. 7D
FIG. 8
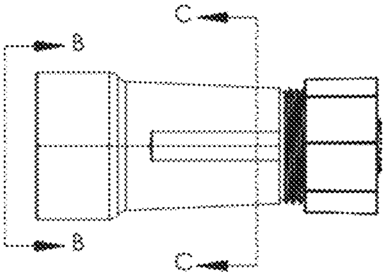
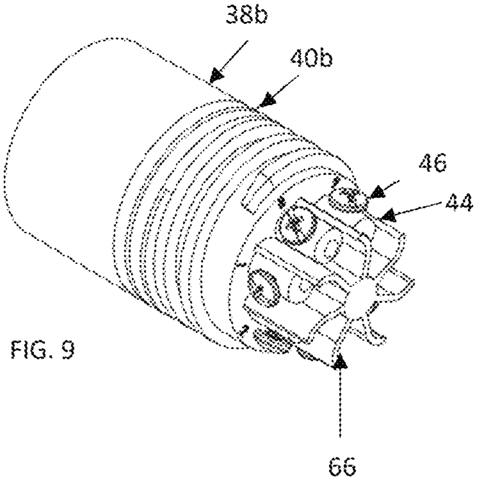
FIG. 9

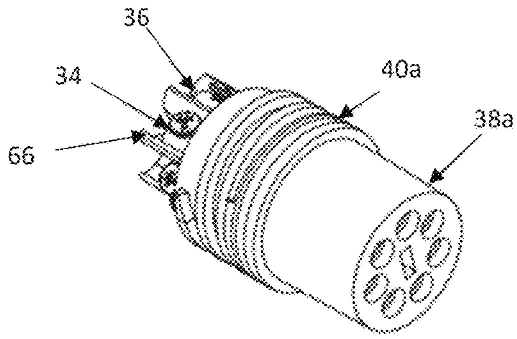
FIG. 10
FIG. 12
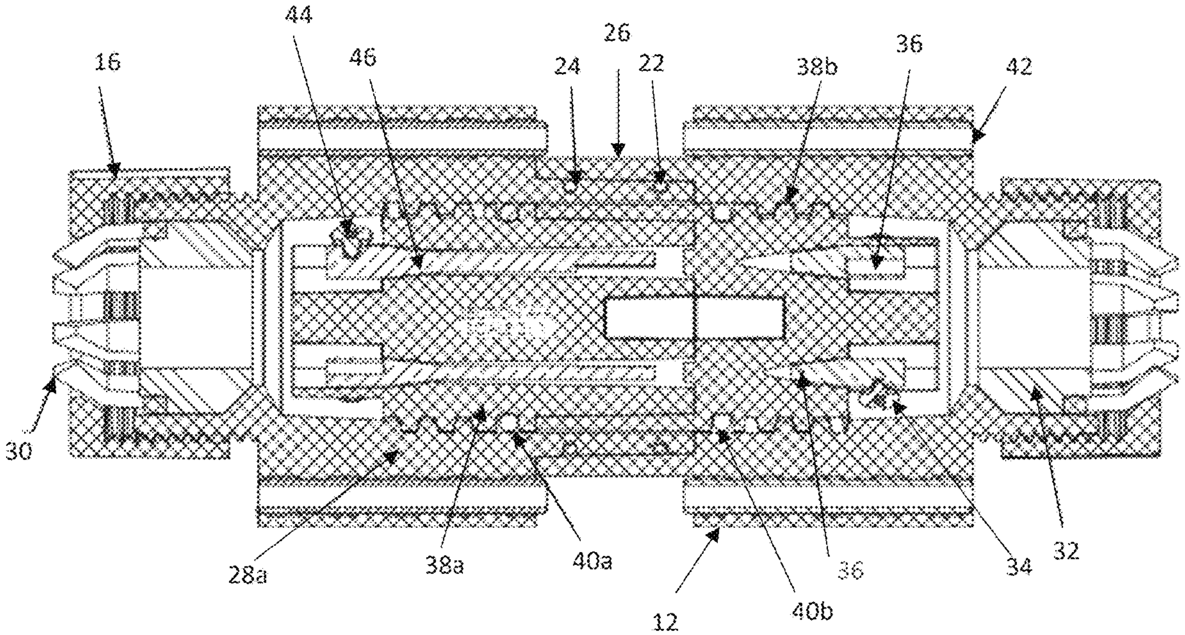
FIG. 11
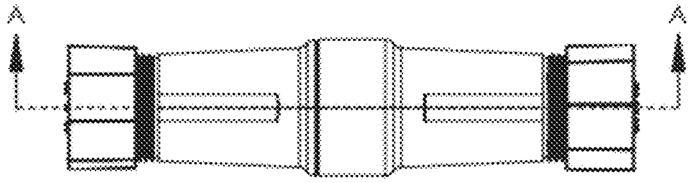

BREAK-AWAY CONNECTOR FOR DATA AND ELECTRICITY

FIELD OF THE DISCLOSURE

The present disclosure relates to break-away connectors and more particularly to data and electrical connectors that separate when subjected to a force without damage to electrical wires or data cables.

BACKGROUND OF THE DISCLOSURE

Traffic signal lights utilize multiple conductors (wires/cables) to both power the traffic lights and to transfer signals. The conductors bridge the lights supported by a pole with controls mounted on the ground nearby the light pole. In the event of a traffic accident, for example, it is possible that a vehicle could impact the light pole, break it at the base, and knock it over. When the pole separates from the ground it pulls on the cables and wires, thus damaging them. This damage requires the wires and cables to be replaced.

Existing connectors use locking mechanisms to ensure their water tightness, where the two connector ends engage and an outside portion twists around an exterior thread to secure the two halves. Some other products in the market act in similar ways but their main function is as a fuse holder.

Conventional connectors with safety features have conductors exposed to the elements, which can cause personal injury, corrode due to the elements, or short and damage to the connector or devices attached to the connector. One existing safety connector for use with electric vehicles provides a shorter wire (pilot conductor or non-conducting line) within the connector that is shorter than conductor wires so it will be pulled off its contact before all of the slack in the power conductors is taken up. This results in a connector that will still be damaged when exposed to an external force.

Wherefore it is an object of the present disclosure to overcome the above-mentioned shortcomings and drawbacks associated with conventional electrical and data connectors.

SUMMARY OF THE DISCLOSURE

It has been recognized that when an industrial light pole is impacted by a vehicle, or the like, the pole is prone to breaking at the base and damaging the internal electrical wires and data cables at great inconvenience and at great expense. One aspect of the present disclosure is a break-away connector for data and/or electricity that separates upon impact and thus mitigates damage to the electrical wire and/or data cables. In some implementations, the amount of force required to separate the connector is adjustable.

In some aspects, the techniques described herein relate to a break-away connector, including: a tether configured to be retained by a pair of anchors, the pair of anchors being affixed to opposing sides of an exterior surface of a housing; the housing having a threaded end and an insert end, and being configured to receive an insert; the insert having a first end and a second end, the insert being configured to receive a set screw style terminal and a plurality of contacts, the insert including: a plurality of ribs at the first end; a threaded portion on the exterior of the insert proximal to the plurality of ribs; and an O-ring located proximal to the threaded portion opposite the plurality of ribs.

In some aspects, the techniques described herein relate to a break-away connector, further including a plurality of O-rings located on the exterior of the second end of the housing.

In some aspects, the techniques described herein relate to a break-away connector, further including a collar at the second end of the housing.

In some aspects, the techniques described herein relate to a break-away connector, further including a pair of wire end caps for securing the tether to the housing via the pair of anchors.

In some aspects, the techniques described herein relate to a break-away connector, wherein the insert threadedly engages with the inside of the housing.

In some aspects, the techniques described herein relate to a break-away connector, wherein the plurality of ribs provides a barrier between each of the plurality of contacts when received by the insert.

In some aspects, the techniques described herein relate to a break-away connector, further including a bushing, a gripper, and a gland nut.

In some aspects, the techniques described herein relate to a break-away connector, wherein the plurality of contacts are sleeves.

In some aspects, the techniques described herein relate to a break-away connector, including: a pair of tethers configured to be retained by a pair of anchors, each of the pair of anchors being affixed to opposing sides of an exterior surface of a respective housing; each housing having a threaded end and an insert end, each being configured to receive an insert; each insert having a first end and second end, the inserts being configured to receive a set screw style terminal and a plurality of contacts, each insert including: a plurality of ribs at the first end; a threaded portion on the exterior of the inserts proximal to the plurality of ribs; and an O-ring located proximal to the threaded portion opposite the plurality of ribs.

In some aspects, the techniques described herein relate to a break-away connector, further including a plurality of O-rings located on the exterior of the second end of one of a pair of housings.

In some aspects, the techniques described herein relate to a break-away connector, further including a collar at the second end of the other of the pair of housings.

In some aspects, the techniques described herein relate to a break-away connector, further including a pair of wire end caps for securing each of the pair of tethers to a respective housing via the pair of anchors.

In some aspects, the techniques described herein relate to a break-away connector, wherein each insert threadedly engages with the inside of a respective housing.

In some aspects, the techniques described herein relate to a break-away connector, wherein the plurality of ribs provides a barrier between each of the plurality of contacts when received by the respective insert.

In some aspects, the techniques described herein relate to a break-away connector, further including a pair of bushings, a pair of grippers, and a pair of gland nuts.

In some aspects, the techniques described herein relate to a break-away connector, wherein a first plurality of contacts are sleeves, and a second plurality of contacts are pins, each being received by a respective insert.

In some aspects, the techniques described herein relate to a method of making a break-away connector, including: inserting a tether into a pair of anchors affixed to opposing sides of an exterior surface of a housing; retaining the tether in the pair of anchors; inserting a set screw style terminal and a plurality of contacts into an insert; threadedly engaging the insert with the interior of the housing at a second end; inserting a bushing and a gripper into a threaded end of the housing; and threading a gland nut onto the threaded end of the housing.

In some aspects, the techniques described herein relate to installing an O-ring to an exterior surface of the insert proximal to a threaded portion of the insert and opposite a plurality of ribs.

In some aspects, the techniques described herein relate to installing a pair of O-rings to an exterior surface of the second end of the housing. In some aspects, the techniques described herein relate to selecting a depth for a groove for each of the pair of O-rings.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular implementations of the disclosure, as illustrated in the accompanying drawings in which like reference characters refer to the same parts throughout the different views. The drawings are not necessarily to scale, emphasis instead being placed upon illustrating the principles of the disclosure.

FIG. 1 shows a perspective view of one implementation of a break-away connector in a connected state according to the principles of the present disclosure.

FIG. 1A shows a cross-sectional enlarged view of one implementation of an anchor according to the principles of the present disclosure.

FIG. 2 shows a perspective view of one implementation of a break-away connector in a connected state installed within a light pole according to the principles of the present disclosure.

FIG. 3A shows a perspective view of one implementation of a first half of a break-away connector in a disconnected state according to the principles of the present disclosure.

FIG. 3B shows a perspective view of one implementation of a mating half of a break-away connector in a disconnected state according to the principles of the present disclosure.

FIG. 4A shows a top view of one implementation of a break-away connector in a connected state according to the principles of the present disclosure.

FIG. 4B shows a top view of one implementation of a break-away connector in a disconnected state according to the principles of the present disclosure.

FIG. 5A shows a perspective view of one implementation of a first half of a break-away connector in a disconnected state according to the principles of the present disclosure.

FIG. 5B shows an exploded view of one implementation of a first half of a break-away connector as shown in FIG. 5A according to the principles of the present disclosure.

FIG. 6A shows a perspective view of one implementation of a mating half of a break-away connector in a disconnected state according to the principles of the present disclosure.

FIG. 6B shows an exploded view of one implementation of a mating half of a break-away connector as shown in FIG. 6A according to the principles of the present disclosure.

FIG. 7A shows an end view of one implementation of a first contact of a break-away connector along cross-section B:B in FIG. 8 according to the principles of the present disclosure.

FIG. 7B shows an end view of one implementation of a mating contact of a break-away connector along cross-section B:B in FIG. 8 according to the principles of the present disclosure.

FIG. 7C shows a cross-sectional view of one implementation of a first contact of a break-away connector along cross-section C:C in FIG. 8 according to the principles of the present disclosure.

FIG. 7D shows a cross-sectional view of one implementation of a mating contact of a break-away connector along cross-section C:C in FIG. 8 according to the principles of the present disclosure.

FIG. 8 shows a top view of one implementation of a contact of a break-away connector according to the principles of the present disclosure showing the location of cross-sections B:B and C:C.

FIG. 9 shows a perspective view of one implementation of a pin insert according to the principles of the present disclosure.

FIG. 10 shows a perspective view of one implementation of a sleeve insert according to the principles of the present disclosure.

FIG. 11 shows a top view of one implementation of a break-away connector in a connected state according to the principles of the present disclosure showing the location of A:A.

FIG. 12 shows a cross sectional view of one implementation of a break-away connector in a connected state with the tethers removed along cross-section A:A in FIG. 11 according to the principles of the present disclosure.

DETAILED DESCRIPTION OF THE DISCLOSURE

Figure 14A:
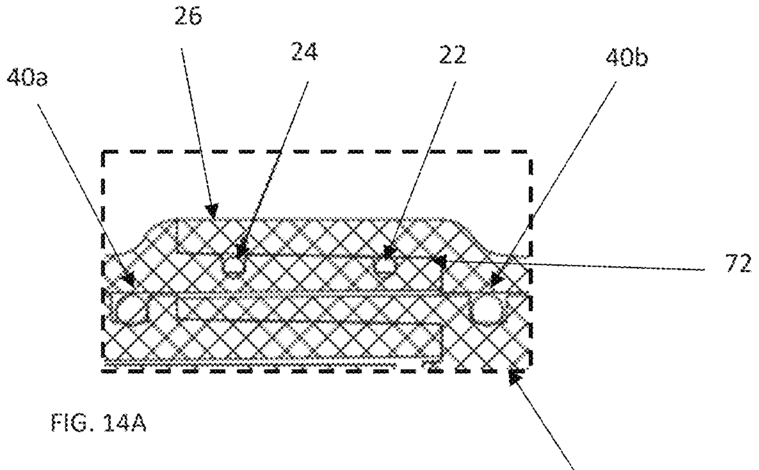
FIG. 14A shows an enlarged view of a region of FIG. 14 showing one implementation of an interface between two halves of a break-away connector according to the principles of the present disclosure.

When an industrial light pole is impacted by a vehicle, or the like, the pole is prone to breaking at the base and damaging the internal electrical wires and data cables at great inconvenience and at great expense. One aspect of the present disclosure is a break-away connector for data and/or electricity that separates upon impact and thus mitigates damage to the electrical wire and/or data cables. In some implementations, the amount of force required to separate the connector is adjustable.

Referring to FIG. 1, a top view of one implementation of a break-away connector in a connected state according to the principles of the present disclosure is shown. More specifically, one implementation of a break-away connector for data and/or electricity has two halves 4, 6, each with a tether 8, 10, respectively. In some cases, the tethers are attached to the connector via anchors 12. In some cases, the tethers are constructed of stainless-steel wire rope, or the like. In certain implementations, the tethers are the same length for ease of manufacturing and to help ensure there aren't mix-ups when assembling/molding over them. In some cases, stainless steel is selected for the material as it is a readily available material and is able to withstand expected forces. In some cases, steel with corrosion resistance coatings is used. In certain cases, the anchors 12 comprise wire end caps that are zinc die cast over stainless-steel wire rope to prevent the tether from sliding out of the anchors and securing the tether to the housing. In some cases, a plastic body is insert molded over these to provide the four anchor points of the pair of tethers.

Referring to FIG. 1A, a cross-sectional enlarged view of one implementation of an anchor is shown. More specifically, die cast ends of a tether 10 have 'notches' or 'ribs' 11 to allow for a plastic over mold, or the like, to lock the tether in place in the anchor 12 in place. In some cases, the die cast ends are made of Zamak #5 alloy zinc, or the like. In some cases, the die cast ends could also be made out of aluminum or stainless steel.

Referring to FIG. 2, a perspective view of one implementation of a break-away connector in a connected state installed in a light pole according to the principles of the present disclosure is shown. More specifically, in certain implementations the break-away connector for data and electricity 2 is installed in a light pole base B. In some cases, the break-away connector for data and electricity 2 is installed in-line to provide a break-away feature that preserves the conductors in the event of an impact. In one implementation, each half of the connector has an external tether 8, 10, respectively, that is configured to attach to either the light pole itself P or the base portion B of the light pole, which is attached to the ground G. In some cases, the tethers are connected via eye bolts 14 and snap clips or the like. In some cases, an eye bolt 14 is embedded in a concrete footing of the base.

Referring to FIG. 3A, a perspective view of one implementation of first half of a break-away connector in a disconnected state according to the principles of the present disclosure is shown. More specifically, one implementation of the first half of the break-away connector is a sleeve half and is configured have a first end 18 that is configured to fit within the mating, or second, half of the break-away connector (See, e.g., FIG. 3B. In one implementation, the first half has a plurality of external housing O-rings 22, 24 at one end to provide a frictional interface when inserted into the second half of the break-away connector as well as a barrier to the environment. In certain implementations, the break-away connector is watertight when assembled.

Referring to FIG. 3B, a perspective view of one implementation of a mating half of a break-away connector in a disconnected state according to the principles of the present disclosure is shown. More specifically, one implementation of the mating half of the break-away connector is a pin half of the connector and is configured to have an end 20 that is configured to fit over an end of the first half of the break-away connector (See, e.g., FIG. 3A). In one implementation, the pin half has a collar 26 that surrounds the end of the first half of the break-away connector when assembled and provides a barrier to the environment and protects the pins. In certain implementations, the break-away connector is watertight when assembled.

Referring to FIG. 4A, a top view of one implementation of a break-away connector in a connected state according to the principles of the present disclosure is shown. More specifically, in certain implementations the two tethers are configured to support a load acting to separate the two halves of the connector (and corresponding conductors) and transfer that load instead to the components of the connector, such that the load does not act on the conductors (wires or cables) coming into the connector. This distribution of the load mitigates damage to the cables and wires saving valuable time and money. Here, the force applied to the connector is shown with arrows and mimics the direction of the force applied to the connector during impact.

Referring to FIG. 4B, a top view of one implementation of a break-away connector in a disconnected state according to the principles of the present disclosure is shown. More specifically, two halves of a break-away connector are shown having a pair of tethers 8, 10, respectively, each of which is anchored on either side of a sleeve housing 28*a* and pin housing 28*b* via anchors 12. The interface where the two halves connect is via a first (sleeve) end insertable into a collar 26 of a pin end. Each half of the connector has a cable gland/strain relief nut 16.

In one implementation, to mitigate damage upon separation, the two halves of the break-away connector are held together via friction. In some cases, shear forces acting on a pair of external housing O-rings, 22, 24, that also act to seal the joint made by the connector halves from water intrusion, provides additional forces to hold the two halves of the connector together. In certain implementations, additional components are used to provide friction sufficient to regulate the amount of force required to separate the two halves of the connector. The force required for separation must be high enough to hold the two halves of the connector together and not separate during normal static use inside the enclosure, yet low enough to easily separate when called upon in an accident.

In certain implementations, the force necessary to separate the two halves of the connector can be adjusted depending on several factors. One factor is the material and durometer of the O-rings used. Another factor is the position of the O-rings grooves relative to the seam created between the two halves of the connector. Yet another factor is the number of O-rings used (See, e.g., FIG. 14A).

Referring to FIG. 5A, a perspective view of one implementation of a first half of a break-away connector in a disconnected state according to the principles of the present disclosure is shown. More specifically, this figure shows a sleeve half of a pin/sleeve break-away connector.

In certain implementations, several parts are manufactured from plastic. In some cases, PBT with 30% glass fill is used for the material for several of the parts (e.g., housings, inserts, and gland nuts). PBT and nylon are common plastics for electrical connectors. PBT is a UV resistant, low water absorption in case of accidental submersion, creep resistant, impact resistant, and chemical resistant material which is good for the end use application. It is also semi-crystalline which allows it to hold its shape better post molding and it flows well in mold tooling, so dimensional accuracy is improved. In some cases, 30% glass fill is added to PBT because that helps increase structural rigidity and avoid shrinkage of the plastic parts to further improve dimensional accuracy.

In some implementations, the grippers (30) are made with PBT (no glass fill) because they benefit from being able to flex as needed for the design. In some cases, they could be made out of PET, Nylon, or other flexible plastics. The bushings (32) are rubber. In some cases, they are Buna-N (nitrile) rubber in some implementations because that material has excellent resistance to petroleum-based oils, fuels, water, alcohols, silicone greases, and hydraulic fluids. Additionally, it has a good balance of desirable working properties like low compression set, high abrasion resistance, and high tensile strength, and the like. The bushings could also be made out of TPE/TPV material.

In some implementations, pin contacts (46) and sockets/sleeve contacts (36) are made of brass per QQ-B-626 Half Hard Alloy 360. QQ-B-626 is an older military specification we but it is the same material standard as ASTM B16, European Standard: EN 12164, C360000, and SAE: AMS4610. They are plated with 100 micro-inches nickel over 100 micro-inches copper to aid in environmental and wear resistance. In some cases, the pins are plated with gold over nickel over copper if needed for further corrosion resistance. All of these materials are UL94 rated or recognized for their dielectric properties (insulating or conducting). Likely to be CE and DIN recognized.

Referring to FIG. 5B, an exploded view of one implementation of a first half of a break-away connector shown in FIG. 5A according to the principles of the present disclosure is shown. More specifically, from the left side of the figure to the right side of the figure the components of the first half of the break-away connector are a tether 8, a gland nut 16, a gripper 30, and a bushing 32. In some cases, the bushing is made of rubber, or the like and the gripper is made of plastic or the like. In certain implementations, a sleeve housing 28*a* of the first half of the break-away connector has a first threaded end configured to receive the gland nut 16, the gripper 30 and the bushing 32 and a second end configured to accept a pair of external housing O-rings 22, 24. In certain implementations, a sleeve insert 38*a* of the first half of the break-away connector has an insert O-ring 40*a* and is configured to receive a set screw style terminal 34 and sleeve contact 36. In certain implementations of the sleeve insert 38*a*, it is threaded on one end for securing it within the sleeve housing 28*a*. A pair of wire end caps 42 are used to retain the tether in the pair of anchors 12 located on opposing sides of the exterior of the sleeve housing 28*a*, to secure the tether to the housing.

Referring to FIG. 6A, a perspective view of one implementation of a mating, or second, half of a break-away connector in a disconnected state according to the principles of the present disclosure is shown. More specifically, this figure shows a pin half of a pin/sleeve break-away connector.

Referring to FIG. 6B, an exploded view of one implementation of a mating, or second, half of a break-away connector shown in FIG. 6A according to the principles of the present disclosure is shown. More specifically, from the left side of the figure to the right side of the figure the components of the second half of the break-away connector are an insert O-ring 40*b*, a pin insert 38*b*, and a pair of wire end caps 42. The pair of wire end caps 42 are used to retain the tether in the anchors 12 located on either side of the exterior of the pin housing 28*b*. In certain implementations, a pin insert 38*b* of the second half of the break-away connector is configured to receive a set screw style terminal 44 and pin contact 46. In certain implementations of the pin insert 38*b*, it is threaded on one end for securing it within the pin housing 28*b*. In certain implementations, a pin housing 28*b* of the second half of the break-away connector has a first threaded end configured to receive a bushing 32, a gripper 30, and a gland nut 16 and a second end having a collar 26 that is configured to receive the first half or sleeve end of the break-away connector when assembled.

Referring to FIG. 8, a top view of one implementation of a contact of a break-away connector according to the principles of the present disclosure showing the location of cross-sections B:B and C:C is shown. In some cases, the contact may be a pin contact or a socket contact, in some case may be referred to as a pin plug and sleeve plug, respectively.

Referring to FIG. 7A, an end view of one implementation of a first contact of a break-away connector along cross-section B:B in FIG. 8 according to the principles of the present disclosure is shown. FIG. 7A and FIG. 7B are end views looking down into the 'barrel' of the connector looking at the sockets/sleeves (FIG. 7A) and pin contacts (FIG. 7B), respectively. More specifically, in certain implementations, there is a slotted hole 48, recess, or the like, configured to facilitate unscrewing a sleeve insert from a housing sleeve, for example. In some cases, the ends of the break-away connector are keyed 50 to prevent misalignment. In certain cases, a leading earth/ground conductor 52 is present. In certain implementations, the electrical contacts are pins and/or sockets (also known as sleeves). In other implementations, the electrical contacts are blade style terminal/receptacles or the like. For simplicity, the contacts described herein have been referred to as pins and sleeves. In this figure, the conductors are sleeves.

It is understood that signal lights use a specific cable, called International Municipal Signal Association (IMSA) cable with standard industry designations: 19-1 or 20-1, solid or stranded. Generally, the gauges of wire used are 16-12 AWG.

Referring to FIG. 7B, a cross sectional view of one implementation of a mating contact of a break-away connector along cross-section B:B in FIG. 8 according to the principles of the present disclosure is shown. More specifically, in certain implementations, the ends of the break-away connector are keyed 50 to prevent misalignment. In certain cases, a leading earth/ground conductor 52 is present. In this figure, the conductors are pins configured to be received by sleeves. It is understood that a number of mating arrangements for conductor pairs are within the scope of this disclosure.

Referring to FIG. 7C and FIG. 7D, cross sectional views of one implementation of a first and a second contact of a break-away connector along cross-section C:C in FIG. 8 according to the principles of the present disclosure is shown. More specifically, in one implementation set screw style terminals 60 with a combination head are used so a standard sized Philips or slotted screwdriver can be used. In some cases, the screws are stainless steel. For ease of manufacture and repair, in some implementations, each contact is numbered 62. In certain implementations, each contact has an aperture 64 configured to receive a wire. In some cases, ribs 66 are used to provide isolation between circuits. In certain cases, a tight gap 68 is located between a side wall and the screw head to prevent a loose screw from touching a neighboring contact. In some cases, there is a gap 70 between circuits.

Referring to FIG. 9, a perspective view of one implementation of a pin insert according to the principles of the present disclosure is shown. More specifically, the figure provides a perspective view of one implementation of a set screw style terminal 44 and pin contact 46, where the contacts are separated by ribs. A threaded portion is shown which contains an insert O-ring 40*b*. Referring to FIG. 10, a perspective view of one implementation of a sleeve insert according to the principles of the present disclosure is shown. More specifically, the figure provides a perspective view of one implementation of a set screw style terminal 34 and sleeve contact 36, where the contacts are separated by ribs 66. A threaded portion is shown which contains an insert O-ring 40*a*. In one implementation, the connector has seven conductors (here represented by sleeves). Other implementations may have four or nine conductors. In yet other implementations, the number of conductors varies, for example, 5, 10, 12, 16, 20 or the like.

Referring to FIG. 11, a top view of one implementation of a break-away connector according to the principles of the present disclosure showing the location of cross-section A:A is shown. More specifically, the image has both tethers removed and the anchors are shown bisected by the A:A line.

Referring to FIG. 12, a cross sectional view of one implementation of a break-away connector with the tethers removed along cross-section A:A in FIG. 11 according to the principles of the present disclosure is shown. More specifically, the image has both tethers removed and the anchors 12 are shown on either side of each housing (a total of four anchors per connector). The cross-sectional view provides a view of the interaction between the two halves of the break-away connector of the present disclosure. A pair of insert O-rings 40*a*, 40*b* help retain the inserts (e.g., sleeve and pin) in the respective sleeve housing 28*a* and pin housing 28*b*. Another pair of external housing O-rings 22, 24 are located on the exterior of the sleeve housing. In this view, the tethers are removed but the diecast ends are present.

Figure 13:
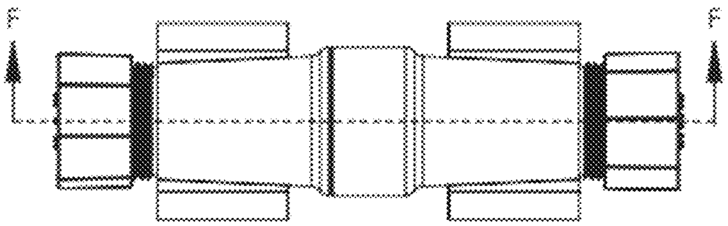
FIG. 13 shows a top view of one implementation of a break-away connector in a connected state according to the principles of the present disclosure showing the location of cross-section F:F.

Referring to FIG. 13, a top view of one implementation of a break-away connector according to the principles of the present disclosure showing the location of cross-section F:F is shown. More specifically, the image has both tethers removed and the four anchors are shown.

Figure 14:
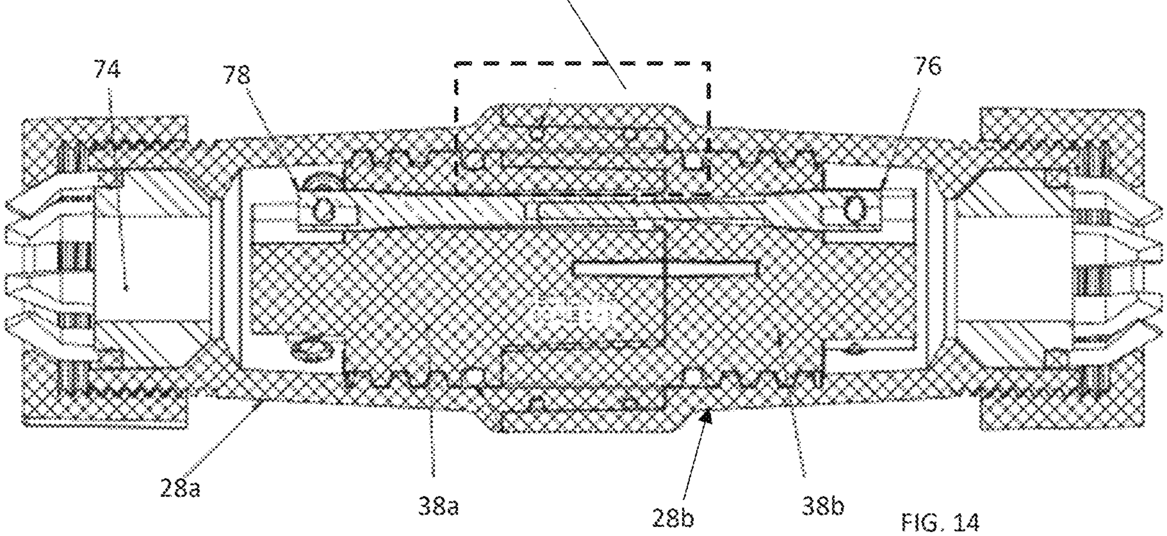
FIG. 14 shows a cross sectional view of one implementation of a break-away connector in a connected state with the tethers removed along cross-section F:F in FIG. 13 according to the principles of the present disclosure.

Referring to FIG. 14, a cross sectional view of one implementation of a break-away connector with the tethers removed along cross-section F:F in FIG. 13 according to the principles of the present disclosure is shown. More specifically, the pin insert 38*b* is shown in the pin housing 28*b* and the sleeve insert 38*a* is shown in the sleeve housing 28*a*. A pin 76 and a sleeve 78 are also shown. A region where cable ends would be is shown by 74. For simplicity, the cables are not shown.

Referring to FIG. 14A, an enlarged view of a region of FIG. 14 showing one implementation of an interface between two halves of a break-away connector according to the principles of the present disclosure is shown. More specifically, the insert O-rings 40*a* and 40*b* are shown. These insert O-rings retain an insert in its respective housing and prevent moisture from penetrating the connector. Seam 72 is shown representing an interface between the outside of the sleeve insert 38*a* and the inside of the pin insert 38*b*. The collar 26 of the pin housing 28*b* is shown. A pair of grooves are formed in the outer surface of the sleeve insert to retain a pair of external housing O-rings 22, 24. One or more of the grooves can be modified to provide for more or less of the external housing O-rings to protrude into the region of seam 72. This variation provides for the ability to modify the amount of friction acting to hold the two halves of the break-away connector together. The material used for the external housing O-rings 22, 24 can also be modified to provide for variations in frictional coefficients acting within seam 72.

Figure 15:
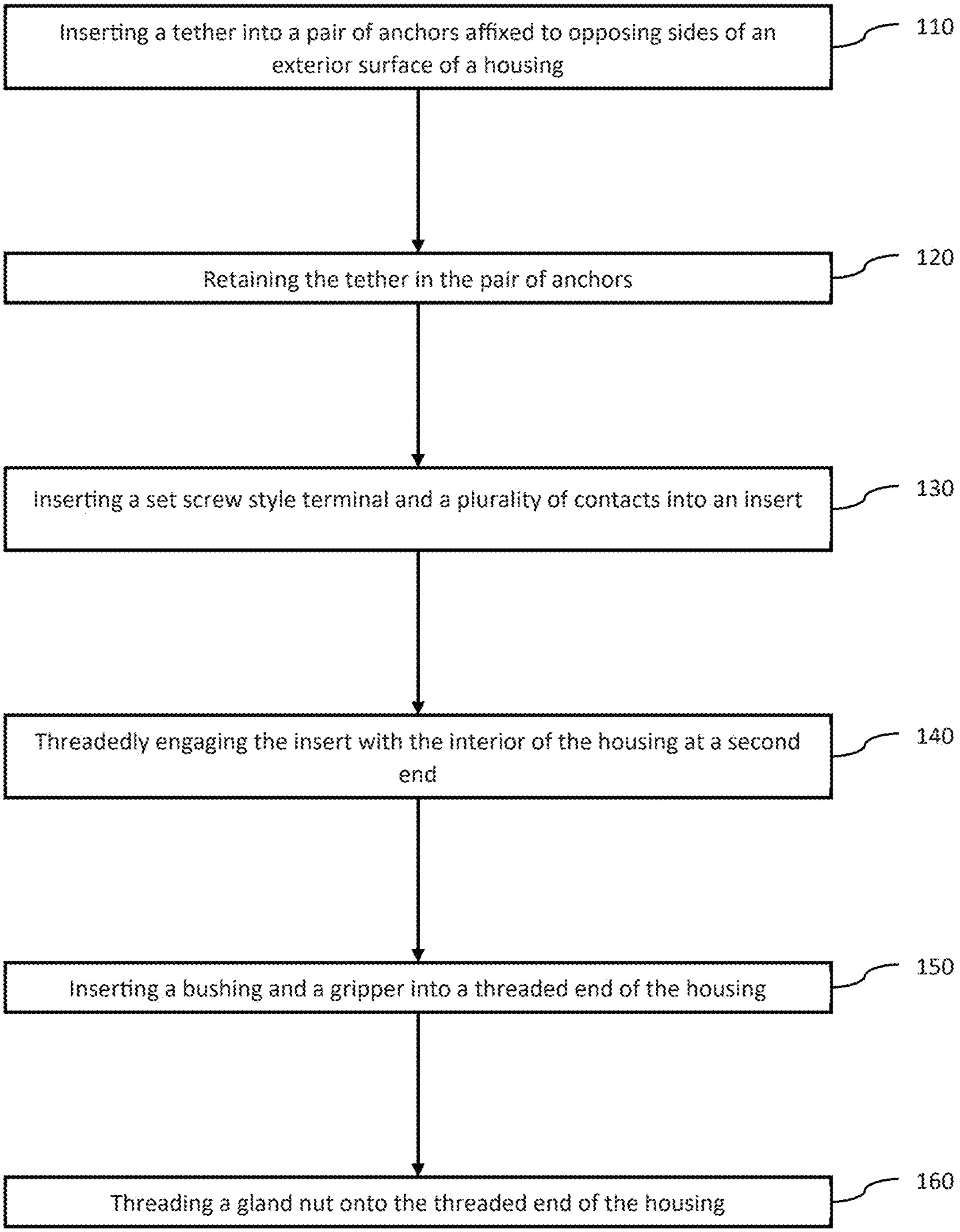
FIG. 15 shows a flow chart of one impletion of a method of making a break-away connector according to the principles of the present disclosure.

Referring to FIG. 15, a flow chart of one impletion of a method of making a break-away connector according to the principles of the present disclosure is shown. More specifically, in one implementation, a tether is inserted into a pair of anchors affixed to opposing sides of an exterior surface of a housing 110. The tether is retained in the pair of anchors 120. A set screw style terminal and a plurality of contacts are inserted into an insert 130 and they are threadedly engaged within the interior of the housing at a second end of the housing 140. A bushing and a gripper are inserted into a threaded end of the housing 150, and a gland nut is threaded onto the threaded end of the housing 160.

In certain implementations of the method, an O-ring is installed to an exterior surface of the insert proximal to a threaded portion of the insert and opposite a plurality of ribs. In another implementation of the method of making a break-away connector, a pair of O-rings are installed to an exterior surface of the second end of the housing. In some cases, a depth for a groove is selected for each of the pair of O-rings. This provides a way to adjust the friction between the two halves when installed and the force required to separate the halves when exposed to an external force.

Various inventive concepts may be embodied as one or more methods, of which an example has been provided. The acts performed as part of the method may be ordered in any suitable way. Accordingly, implementations may be constructed in which acts are performed in an order different than illustrated, which may include performing some acts simultaneously, even though shown as sequential acts in illustrative implementations.

While various inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more"

of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached, or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one implementation, the features and elements so described or shown can apply to other implementations. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An implementation is an implementation or example of the present disclosure. Reference in the specification to "an implementation," "one implementation," "some implementations," "one particular implementation," "an exemplary implementation," or "other implementations," or the like, means that a particular feature, structure, or characteristic described in connection with the implementations is included in at least some implementations, but not necessarily all implementations, of the invention. The various appearances "an implementation," "one implementation," "some implementations," "one particular implementation," "an exemplary implementation," or "other implementations," or the like, are not necessarily all referring to the same implementations.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various implementations of the disclosure are examples and the disclosure is not limited to the exact details shown or described.

While various implementations of the present invention have been described in detail, it is apparent that various modifications and alterations of those implementations will occur to and be readily apparent to those skilled in the art. However, it is to be expressly understood that such modifications and alterations are within the scope and spirit of the present invention, as set forth in the appended claims.

The foregoing description of the implementations of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other implementations are contemplated within the scope of the present disclosure in addition to the exemplary implementations shown and described herein. Modifications and substitutions by one of ordinary skill in the art are considered to be within the scope of the present disclosure.

What is claimed:

1. A break-away connector, comprising:

a tether configured to be retained by a pair of anchors, the pair of anchors being affixed along opposing sides of an exterior surface of a housing, wherein each end of the tether is over molded to lock the tether in place in the pair of anchors, and wherein the housing is a sleeve housing or a pin housing;

the housing having a threaded end and an insert end, the insert end being configured to receive an insert;

a plurality of O-rings located on an exterior surface of the insert end of the housing; and the insert having a threaded end and a second end, the insert being configured to receive a set screw style terminal and a plurality of contacts, the insert comprising:

a plurality of ribs extending out from the threaded end;

at the threaded end of the insert, a threaded portion is on an exterior of the insert proximal to the plurality of ribs, wherein the insert threadedly engages within an interior surface of the housing; and an O-ring located at an end of the threaded portion of the insert that is opposite the plurality of ribs.

2. The break-away connector according to claim 1, further comprising a collar at the insert end of the housing.

3. The break-away connector according to claim 1, further comprising a pair of wire end caps for securing the tether to the housing via the pair of anchors.

4. The break-away connector according to claim 1, wherein a depth for a groove for each of the plurality of O-rings modifies a force required to separate a pair of housings.

5. The break-away connector according to claim 1, wherein the plurality of ribs provides a barrier between each of the plurality of contacts when received by the insert.

6. The break-away connector according to claim 1, further comprising a bushing and a gripper inserted into the threaded end of the housing, and a gland nut for threading onto the threaded end of the housing.

7. The break-away connector according to claim 1, wherein the plurality of contacts are sleeves.

8. A break-away connector, comprising:

a pair of tethers configured to each be retained by a pair of anchors, each of the pair of anchors being affixed along opposing sides of an exterior surface of a respective housing, wherein each end of the pair of tethers is over molded to lock the pair of tethers in place in each of the pair of anchors, and wherein the respective housing is a sleeve housing or a pin housing;

each housing having a threaded end and an insert end, each insert end being configured to receive an insert;

a plurality of O-rings located on an exterior surface of the insert end of one of a pair of housings; and each insert having a threaded end and second end, each insert being configured to receive a set screw style terminal and a plurality of contacts, each insert comprising:

a plurality of ribs extending out from the threaded end;

at the threaded end of the insert, a threaded portion is on an exterior of the insert proximal to the plurality of ribs, wherein the insert threadedly engages within an interior surface of the housing; and an O-ring located at an end of the threaded portion of the insert that is opposite the plurality of ribs.

9. The break-away connector according to claim 8, further comprising a collar at the insert end of another of the pair of housings.

10. The break-away connector according to claim 8, further comprising a pair of wire end caps for securing each of the pair of tethers to a respective housing via the pair of anchors.

11. The break-away connector according to claim 8, wherein a depth for a groove for each of the plurality of O-rings modifies a force required to separate a pair of housings.

12. The break-away connector according to claim 8, wherein the plurality of ribs provides a barrier between each of the plurality of contacts when received by a respective insert.

13. The break-away connector according to claim 8, further comprising a bushing and a gripper inserted into the threaded end of the housing, and a gland nut for threading onto the threaded end of the housing.

14. The break-away connector according to claim 8, wherein a first plurality of contacts are sleeves, and a second plurality of contacts are pins, each being received by a respective insert.

15. A method of making a break-away connector, comprising:

inserting a tether into a pair of anchors affixed along opposing sides of an exterior surface of a housing, wherein the housing is a sleeve housing or a pin housing;

retaining the tether in the pair of anchors;

over molding each end of the tether to lock the tether in place in the pair of anchors;

inserting a set screw style terminal and a plurality of contacts into an insert;

installing an O-ring to an exterior surface of the insert at an end of the threaded portion of the insert that is opposite the plurality of ribs;

threadedly engaging the insert within an interior of the housing at a insert end of the housing;

installing a pair of O-rings to an exterior surface of the insert end of the housing;

inserting a bushing and a gripper into a threaded end of the housing; and threading a gland nut onto the threaded end of the housing.

16. The method of making a break-away connector according to claim 15, further comprising installing a pair of wire end caps for securing each of the pair of tethers to a respective housing via the pair of anchors.

17. The method of making a break-away connector according to claim 15, further comprising selecting a depth for a groove for each of the pair of O-rings.

* * * * *